UNITED STATES PATENT OFFICE.

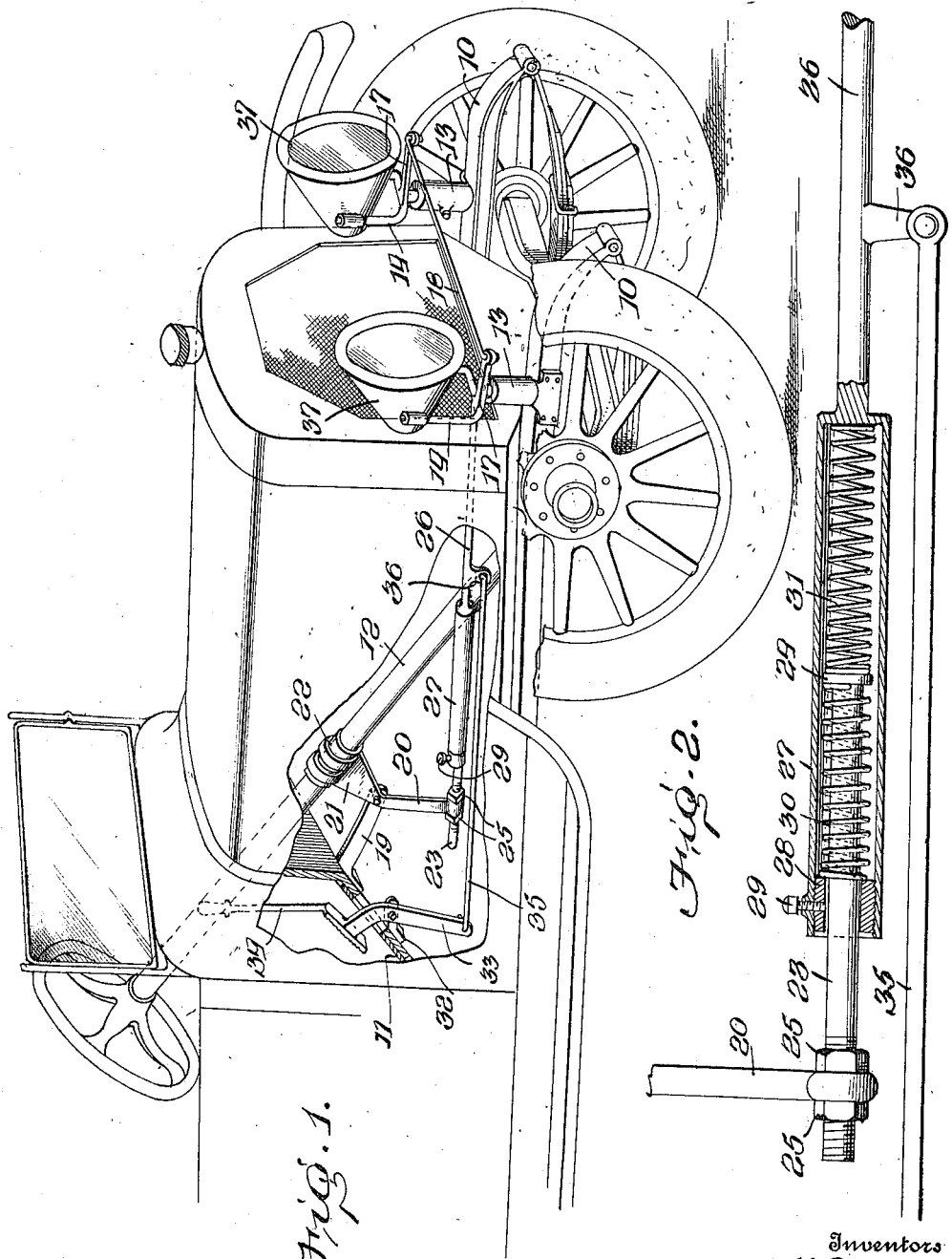

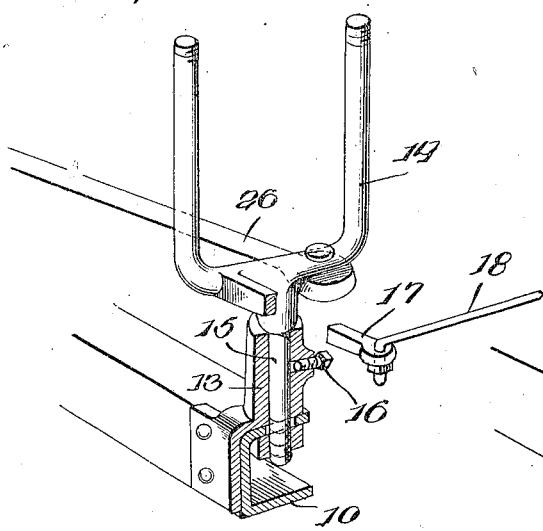
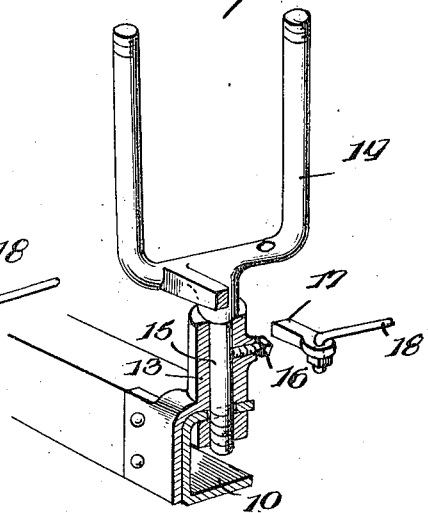
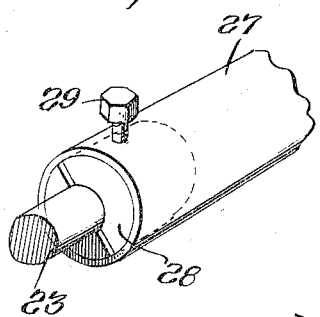
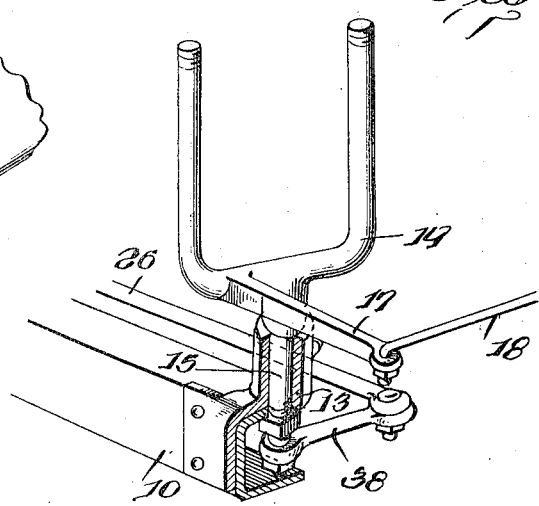

CHARLES H. QUARLES AND GARNET W. SAVIN, OF CHARLOTTESVILLE, VIRGINIA.

HEADLIGHT-STEERING MECHANISM.

1,221,905.   Specification of Letters Patent.   Patented Apr. 10, 1917.

Application filed September 13, 1916. Serial No. 119,920.

*To all whom it may concern:*

Be it known that we, CHARLES H. QUARLES and GARNET W. SAVIN, citizens of the United States, residing at Charlottesville, in the county of Albermarle and State of Virginia, have invented certain new and useful Improvements in Headlight-Steering Mechanisms, of which the following is a specification.

This invention contemplates an improved head-light steering mechanism for motor vehicles and has as its primary object to provide an arrangement wherein the headlights will be automatically turned as the vehicle is steered to direct the rays of the said lights in the path of the vehicle and also wherein said headlights may be manually rotated, when desired, to turn the said lights in a particular direction, independently of the automatic steering mechanism therefor.

The invention has as a further object to provide an arrangement wherein, when the headlights are manually shifted, the said lights will be yieldably returned for coöperation with the automatic steering mechanism therefor.

And the invention has as a still further object to provide a construction wherein, if desired, the mechanism employed for manually shifting the headlights may be rendered inoperative.

Other and incidental objects will appear as the description proceeds and in the drawings wherein we have illustrated the preferred embodiment of the invention and wherein similar reference characters designate corresponding parts throughout the several views:

Figure 1 is a fragmentary perspective view showing our improved mechanism applied to a conventional type of motor vehicle, the motor vehicle being partly broken away, Fig. 2 is a fragmentary detail sectional view of the sliding connection between the mechanism employed for automatically turning the headlights as the vehicle is steered and the mechanism for manually turning the said headlights, Fig. 3 is a detail perspective view partly in section, and particularly showing the mounting of the lamp brackets, Fig. 4 is a similar view illustrating the manner in which the said brackets may be locked against rotation, Fig. 5 is a fragmentary detail perspective view particularly showing the construction of stop sleeve employed in the connection illustrated in detail in Fig. 2, and Fig. 6 is a fragmentary detail perspective view partly in section and showing a slight modification in the connection between the operating rod of the lamp brackets with one of said brackets.

In order that the construction, mounting and operation of our improved mechanism may be accurately understood, we have, in the drawings, illustrated the said mechanism in connection with a conventional type of motor vehicle having a chassis including spaced parallel side members 10 and provided adjacent the front dash thereof with an inclined floor 11. Operatively associated with the steering mechanism of the vehicle, is a steering post 12.

Coming now more particularly to the subject of the present invention, upstanding socket members 13 are employed which are suitably connected to the side members 10 of the vehicle chassis in front of the radiator of the vehicle and are arranged opposite each other. Mounted upon these brackets are lamp brackets 14 provided, as more particularly shown in Figs. 3 and 4 with stems 15 projecting freely through the said socket members and receiving nuts at their lower extremities for holding the said brackets in position. Screw threaded through the inner sides of the socket members 13 are radially disposed locking pins 16 adjustable to engage the stems 15 of the said brackets for holding the said brackets against rotation, this being for a purpose which will presently appear. However, it may be stated at this point that the brackets are normally free to rotate. Extending forwardly from the laterally extending portions of the forks 14, are crank arms 17 pivotally connected at their outer extremities by a transverse rod 18.

Mounted upon the floor 11 beneath the forward dash of the vehicle is a forwardly extending bracket 19 and pivotally connected to this bracket is a rock arm 20 terminating at its upper extremity in a toothed segment 21 engaging a worm 22 fixed upon the steering post 12 of the vehicle. Pivotally connected to the lower extremity of the rock arm 20 is a stub rod 23 provided at one extremity with an annular head 24 and being screw threaded adjacent its opposite extremity to receive stop nuts 25 confronting opposite sides of the lower extremity of the lever 20 which is preferably rolled or looped to freely receive the rod. It is to be observed that this construction provides an arrangement for adjustably connecting the rod 22 with the said lever.

Pivotally connected at its outer extremity to the laterally extending portion of the adjacent lamp fork 14 is an operating rod 26 which terminates at its inner extremity in a longitudinally extending tubular casing 27. This casing freely receives the forward extremity of the stub rod 23 which is loosely fitted through a stop sleeve 28 preferably screw threaded into the open end of the casing 27 and a radial locking pin 29 is screw threaded through the wall of the casing to extend through the said sleeve for holding the sleeve against displacement. As particularly shown in Fig. 5 of the drawings, the sleeve 28 is formed at its outer end with suitable notches adapted to receive a spanner tool for displacing the sleeve. Bearing between the head 24 of the stub rod 23 and the top sleeve 28, is a helical spring 30 and bearing between the head of the stub rod and the inner end of the casing is a similar spring 31.

Projecting forwardly from the underside of the floor 11 below the bracket 19 is a bracket 32 and pivotally mounted upon this bracket is a foot lever 33 extending through the floor 11 and provided, at its upper extremity with an upstanding hand lever 34 of approved type. Pivotally connected, at its inner extremity to the lower end of the lever 33 is a rod 35, the forward extremity of which is pivotally attached to an arm 36 extending laterally from the operating rod 26 adjacent the inner end thereof. As will now be clear, the foot lever 33, the hand lever 34, the connecting rod 35 and the operating rod 36 provide a mechanism for manually operating or turning the brackets 14. These brackets are designed to receive any approved type of headlights which have been conventionally shown at 37. Consequently, by manipulating either the hand lever 34 or the foot lever 33, the headlights 37 will be correspondingly rotated.

Upon the movement of the steering post 12 to guide the vehicle in either one direction or the other, the worm 22 will act upon the lever 20 to correspondingly rock the said lever. Rearward movement of the lever will be communicated to the stub rod 23 and through the spring 30 by means of the head 24 upon the said rod to the sleeve 28 and thence to the operating rod 26 for correspondingly rotating the headlights as the vehicle is steered in one direction. Reverse movement of the steering post will swing the lever 20 in the opposite direction which movement of the lever will be communicated through the stub rod 23 to the spring 31 and thence to the operating rod 26 to correspondingly rotate the headlights when the vehicle is steered in the opposite direction. The worm 22, the lever 20 and the stub rod 23 thus provide a mechanism operatively connected with the operating rod 26 by means of the casing 27, the stop sleeve 28 and the springs 30 and 31 for automatically steering the headlights in the path of the vehicle as the vehicle is guided.

Should it be desired to manually turn the headlights 37 independently of the mechanism for automatically rotating the said headlights with the steering of the vehicle, either the hand lever 34 or the foot lever 35 may be operated for this purpose. Rearward movement of the inner extremity of the lever 33 will be communicated to the rod 35 to shift the said rod rearwardly and correspondingly rotate the headlights 37 in one direction. Upon the rearward movement of the rod 26, the spring 31 will be compressed against the head 24 of the stub rod 23 so that upon the release of the lever 33, the headlights 37 will be yieldably returned to their original position by the said spring 31 with the mechanism for manually shifting the said headlights then again normally disposed with respect to the mechanism for automatically shifting the said headlights to be operated thereby. Forward movement of the lever 33 will be communicated to the rod 35 to shift the operating rod 26 outwardly and correspondingly rotate the headlights 37 in the opposite direction. Upon the outward movement of the rod 26, the spring 30 will be compressed against the head 24 of the stub rod 23 so that upon the release of the lever 33, the said spring 30 will again return the mechanism for manually shifting the headlights into normal relation with respect to the mechanism for automatically rotating the said headlights. It will therefore be seen that the headlights may, when desired, be manually shifted in either direction independently of the mechanism for automatically steering the headlights as the vehicle is guided and, upon the release of the headlights when so manually shifted, the mechanism for manually operating the headlights will be yieldably returned to normal active position with respect to the mechanism for automatically steering the said headlights.

In some instances, it may be desired to render the mechanism for manually shifting the said headlights inoperative. The locking pin 29 is thus mounted for adjustable engagement with the stub rod 33 for establishing a rigid connection between the said rod and the operating rod 26. With these rods so connected, the springs 30 and 31 will be rendered inactive so that the foot lever 33 and hand lever 34 cannot then be operated. At the same time, it will be seen that the operation of the mechanism for automatically steering the headlights will not be affected. Should any of the connections between the headlights and the operating mechanism therefore become broken or impaired, the locking pins 16 are provided so that these pins may be adjusted to engage the stems 15 of the lamp brackets for holding the headlights fixed. It will therefore be seen that I provide a highly efficient construction for the purpose set forth and an arrangement which may be readily employed in connection with substantially any conventional type of motor vehicle.

In Fig. 6 of the drawings, we have illustrated a slight modification in the connection between the operating rod 26 and the adjacent lamp bracket 14. In this modification, the stem 15 of the said bracket is extended downwardly and is formed to receive a laterally and inwardly projecting crank arm 38 fixed to the said stem and pivotally receiving the rod 26 at its outer extremity. In some instances, this connection between the said rod and the lamp brackets may be found convenient.

Having thus described our invention, what we claim and desire to secure by Letters Patent is:

1. A headlight steering mechanism including rotatably mounted lamp receiving brackets, an operating rod therefor, a casing carried by said rod, a stub rod slidable within the said casing, means connected to the said stub rod and operatively engaged with the steering mechanism of the vehicle, opposed springs housed within the casing and bearing between the stub rod and the said casing with the said means operable to shift the operating rod for rotating the said brackets as the vehicle is steered, and manually operable means connected to the said operating rod for rotating the said brackets independently of said first mentioned means with the said springs adapted to return the brackets to position for actuation by the said first mentioned means.

2. A headlight steering mechanism including rotatably mounted lamp receiving brackets, an operating rod therefor provided with a casing, a stub rod slidable within the said casing, a stop sleeve loosely receiving said stub rod, opposed yieldable means arranged within the casing and bearing between the stub rod, the casing, and said sleeve, actuating means connected to the stub rod and operatively engaged with the steering mechanism of the vehicle for automatically rotating the said brackets as the vehicle is steered, manually operable means connected to said operating rod for shifting the operating rod against the tension of said yieldable means to rotate the said brackets independently of said actuating means, and locking means for the sleeve operable to engage said stub rod to establish a rigid connection between the said actuating means and the said operating rod.

3. A headlight steering mechanism including rotatably mounted lamp receiving brackets, an operating rod therefor provided with a casing, a stub rod slidably received within said casing and provided with a head, opposed yieldable means arranged within the casing and operatively bearing between the said head and opposite extremities of the casing, actuating means connected to said stub rod and operatively engaged with the steering mechanism of the vehicle for automatically rotating said brackets as the vehicle is steered, a manually operable lever, and a connection between the said lever and the said operating rod for shifting the operating rod against the tension of said yieldable means to rotate the said brackets independently of said actuating means.

4. A headlight steering mechanism including rotatably mounted lamp receiving brackets, an operating rod therefor provided with a casing, a stub rod slidable within the casing, a stop sleeve loosely receiving said stub rod, opposed yieldable means arranged within the casing and bearing between the stub rod, the casing and said sleeve, actuating means connected to the stub rod and actively engaged with the steering mechanism of the vehicle for automatically rotating said headlights as the vehicle is steered, manually operable means connected to said operating rod for shifting the said operating rod against the tension of said yieldable means to rotate the brackets independently of said actuating means, and a locking pin for the said sleeve arranged with the said pin operable to engage said stub rod to establish a rigid connection between the said actuating means and the said operating rod.

5. A headlight steering mechanism including rotatably mounted lamp receiving brackets, an operating rod therefor provided with a casing, a stub rod slidable within said casing, a stop sleeve loosely receiving said stub rod, opposed yieldable means bearing between the stub rod, the casing and said sleeve, a worm carried by the steering post of the vehicle and a rock lever engaged with said worm and connected with said stub rod for automatically rotating the said brackets as the vehicle is steered.

In testimony whereof we affix our signatures.

CHAS. H. QUARLES. [L. S.]
G. W. SAVIN. [L. S.]